United States Patent [19]

Khalid et al.

[11] Patent Number: 5,059,093
[45] Date of Patent: Oct. 22, 1991

[54] COMPRESSOR BLEED PORT

[75] Inventors: Syed J. Khalid; Brian A. Robideau, both of Palm Beach Gardens, Fla.

[73] Assignee: United Technologies Corporation, Hartford, Conn.

[21] Appl. No.: 534,226

[22] Filed: Jun. 7, 1990

[51] Int. Cl.⁵ .............................................. F01D 5/14
[52] U.S. Cl. .................... 415/115; 60/39.07
[58] Field of Search ...................... 415/115, 116, 169.1, 415/914; 60/39.07

[56] References Cited

U.S. PATENT DOCUMENTS 3,066,912 12/1962 Scheper, Jr. .......................... 253/76
3,844,343 10/1974 Burggraf ............................ 415/116
4,156,344 5/1979 Cuthbertson et al. ................ 60/226
4,463,552 8/1984 Monhart et al. .................... 60/226.1
4,471,910 9/1984 de Paul et al. ....................... 239/124
4,546,605 10/1985 Mortimer et al. .................. 60/39.07

Primary Examiner—John T. Kwon
Assistant Examiner—Christopher M. Verdier
Attorney, Agent, or Firm—Edward L. Kochey, Jr.

[57] ABSTRACT

Rectangular bleed ports (24) are circumferentially arranged. Each port has an average radius (r) greater than 30 percent of the port width (W) throughout the reactant surface of the upstream facing edge (30), thereby avoiding flow separation from the surface. A tangent point (36) at the junction of the reactant surface (36) and the inside surface of casing (12) is located a distance (x) upstream to blades (18) greater than 40 percent of the spacing between the blades. This reduces flow losses in the ports caused by blade upwash.

21 Claims, 3 Drawing Sheets

COMPRESSOR BLEED PORT

The Government has rights in this invention pursuant to a contract awarded by the Department of the Air Force.

DESCRIPTION

1. Technical Field

The invention relates to axial flow air compressors and in particular to a bleed port arrangement therein.

2. Background of the Invention

Axial flow air compressors are used in gas turbine engines for the purpose of establishing an appropriately high pressure to achieve substantial thrust by the discharge of the hot gas. Multiple stage compressors are used for this purpose. During certain periods of operation, particularly during start-up, these compressors experience stall or surge potential. This is experienced generally where the low pressure stages lose their lift effectiveness because they have to pump against a pressure too extreme for the flow condition. It is known to unload these stages by bleeding some air out downstream of the low pressure stages during certain periods of operation.

With these large airflow requirements during start-up or with high bypass requirements substantial bleed flow area is required. Much attention has been given to the design of these bleed flow ports to facilitate the passage of air with minimum energy loss. Little or no attention has been given to the effect of these openings, whether flowing or closed, on the compressor through flow.

The large openings inherently produce a loss of the supporting casing surface leading to a loss of effectiveness of the next stage of blades, from this lack of support of the blade upwash. Also, flow separation can occur at the casing surface where a portion of the flow passing into the opening then reenters the mainstream.

Such flow separation degrades stability, flow capacity and the efficiency of the succeeding blade stage. The opening when locating within the effective area of the upwash of the blades also causes such degradation in performance and energy losses due to recirculation in the openings.

SUMMARY OF THE INVENTION

The bleed port openings are located as is conventional in the compressor case between a row of stator vanes and a row of rotating blades. The port openings are each rectangular in shape with the length in the circumferential direction and the width in the axial direction. The upstream facing edge of each opening is shaped with a generous radius to avoid flow separation of air reentering from the opening into the main airstream.

A hypothetical streamline stagnation flowpath is established as a straight line extending through the opening at an angle of 15 degrees from the casing wall at the upstream edge of the opening. This imaginary flowpath intersects the upstream facing edge of the opening at a locus, whereby a reentrance surface is defined between the locus and the inside surface of the casing on this upstream facing edge.

From the flow standpoint it would be preferable to establish this surface as an elliptical shape with the minor radius greater than 25 percent of the width of the opening near the locus and a major radius of up to 50 percent of the width of the opening as this curved surface reaches the inside surface of the casing. From the manufacturing standpoint a uniform curvature is preferred and the ideal radius of such surface would be 33 percent of the width of the opening.

An upwash condition from the rotating blades exists which is a function of the blade tip spacing. The bleed port flow opening should be at a sufficient distance upstream of these blades so that the remaining wall provides support for the airfoil lift producing rotating pressure profile without flow moving in and out of the bleed ports causing energy losses and possibly flow instability. This is preferably a distance equal to 60 percent of the spacing between the blade tips and at least 40 percent of the spacing between the blade tips.

DESCRIPTION OF THE PREFERRED EMBODIMENTS

Figure 1:
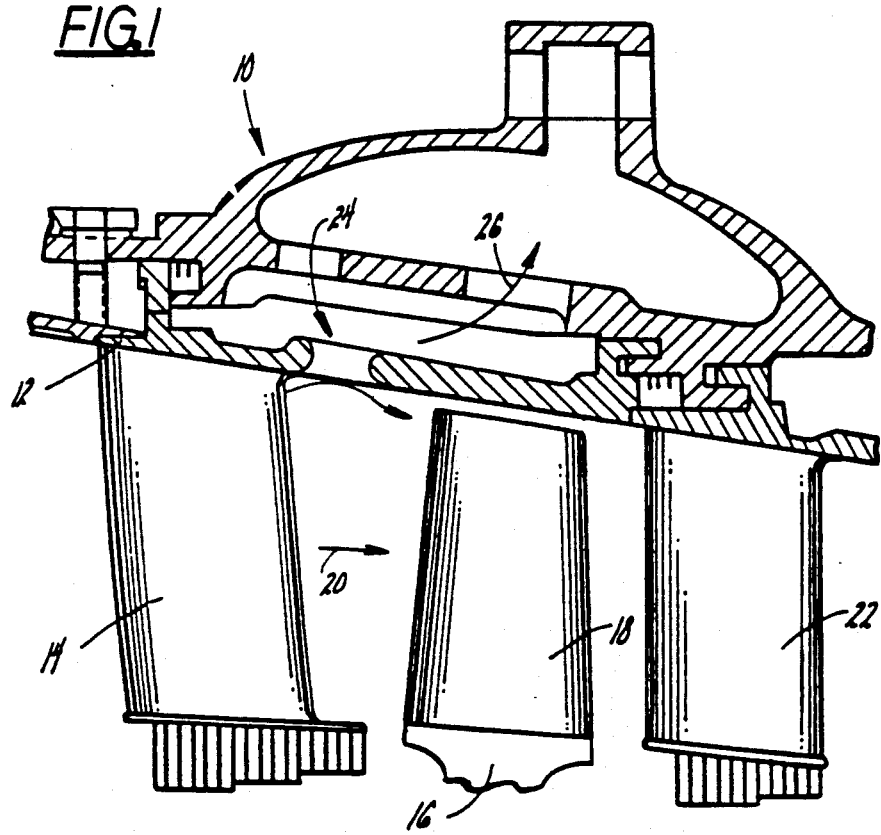
FIG. 1 is a sectional elevation showing a bleed port arrangement.

FIG. 1 illustrates an axial flow air compressor having a compressor casing 12. Secured to the casing is a circumferential row of fixed vanes 14 for guiding the airflow. Rotor 16 carries a circumferentially arranged row of blades 18 which receive air directly from the vanes 14 and which rotate to impart energy to the main airflow 20 passing therethrough. Downstream there is another row of vanes 22 and additional blade and vane sections not shown.

Bleed port 24 permits the extraction of bleed air 26 under the control of a flow valve not shown. Such bleed air may be used for cooling air at certain operating conditions, but the major bleed air requirement is for unloading the upstream stages (not shown) of the compressor during start-up. The overall effective opening of these bleed ports 24 is dictated by that maximum flow requirement.

Figure 2:
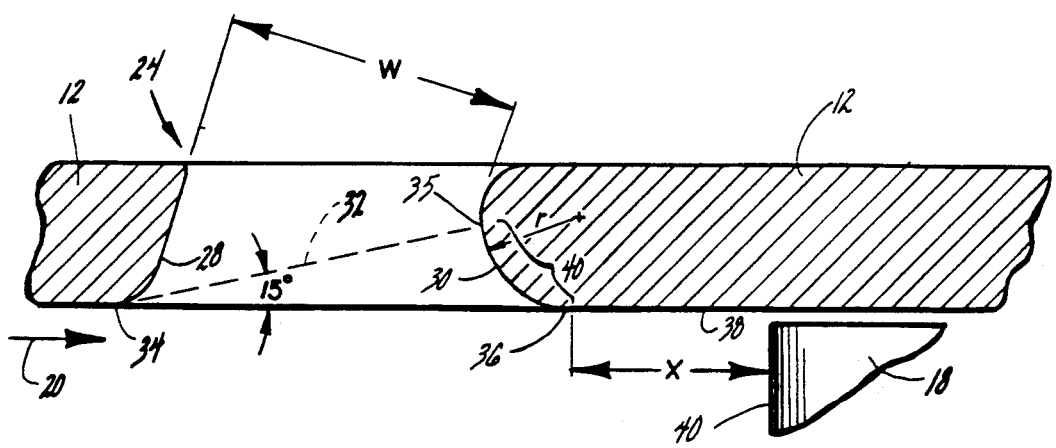
FIG. 2 is the detail section through the casing at the bleed port.
Figure 3:
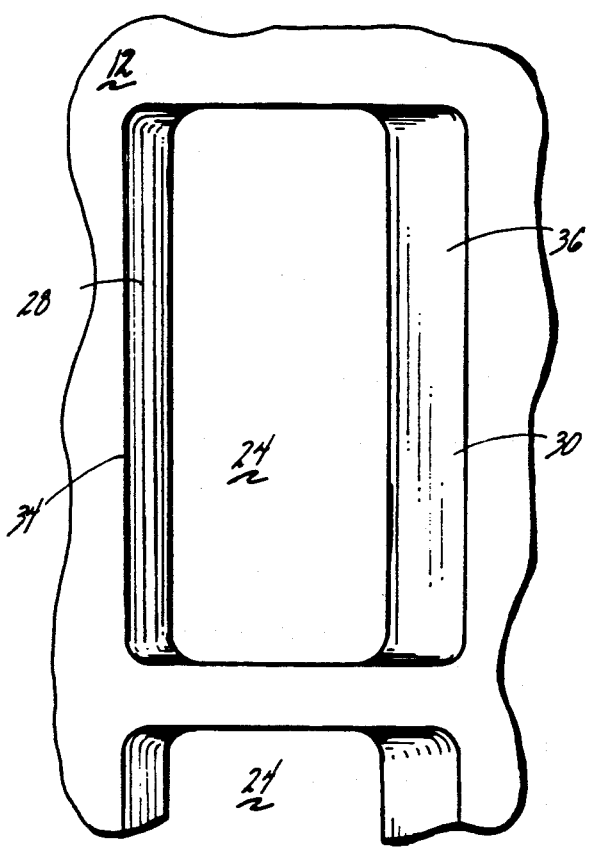
FIG. 3 is a view of the port from inside the casing.

Referring to FIGS. 2 and 3 the bleed port opening 24 has a downstream facing (leeward) edge 28, the shape of which is selected to facilitate the airflow through the bleed port, and which in itself is not a part of this invention.

During operation with no bleed flow a portion of the airflow 20 passes into the opening 24 and must reenter the airstream downstream of the opening. This also occurs to some extent when flow is passing through the bleed port. The upstream facing surface 30 of the opening is to be shaped and sized such that this reentrant airflow remains attached to the surface and does not separate, so as to prevent instability and inefficiency in the operation of blades 18. While an extremely large radius for surface 30 would be appropriate for this surface, it is inconsistent with the need to maintain the appropriate opening of the port for bleed flow purposes.

The limits on the various dimensions set forth below are appropriate for providing a practical structure and avoiding flow separation.

An imaginary straight flowpath 32 is defined from the upstream side of the opening 24 at the casing inside surface 34. This represents the potential streamline stagnation line of the airflow at 15 degrees from the casing inside surface. While the actual line is believed to be somewhat less than 15 degrees, some additional tolerance is placed in this line to allow for some circumferential flow component established by the vanes in the flow passing over the openings. This imaginary flowpath 20 establishes a locus 35 on the upstream facing surface 30 of the opening. It is between this locus and the tangent point 36 where the curved surface 30 meets the inside surface 38 of the casing to which attention is given to avoid flow separation. The portion of the upstream facing surface between the locus 35 and the tangent point 36 is referred to as the reentrant surface 40.

From a manufacturing viewpoint this is most conveniently fabricated with the uniform radius. As illustrated in FIG. 2 with the width of opening W, the radius r is preferably 33 percent of the width of the port. The minimum radius is about 30 percent of the width of the port. It is the radius of this reentrant surface which is significant and the surface 40 outboard of locus 35 may be fabricated as convenient to optimize the overall flow through the port.

Each of the ports 24 is rectangular in shape having the length in the direction circumferentially around the casing and the width in the axial flow direction. These ports should be as rectangular as possible, with the corners being rounded only for the purpose of facilitating manufacturing and for minimizing stress concentrations. Should these ports approach the circular shape, flow entering the port will achieve a circumferential component as it nears the upstream facing edge. The component from each of the two sides of the opening would pass toward the center. This would tend to promote a flow peak at that one location thus exacerbating flow perturbations through the opening.

Figure 4:
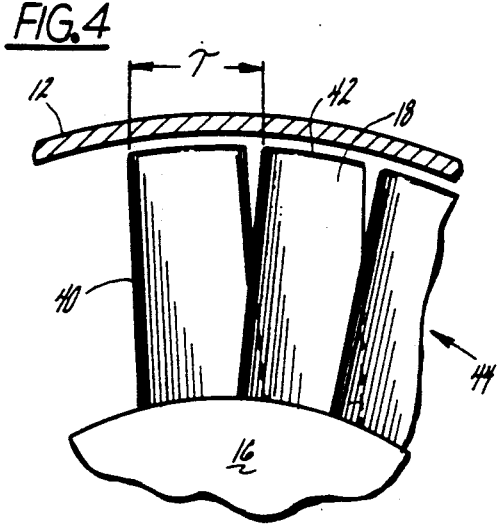
FIG. 4 is an axial view showing the compressor blades.

FIG. 4 is a view looking in the axial direction showing the plurality of blades 18 on rotor 16. Each blade has a leading edge 40 which is the most upstream portion and is near the bleed port 24. At the tips 42 of the blades the spacing between the leading edges is a distance $\tau$.

Figure 5:
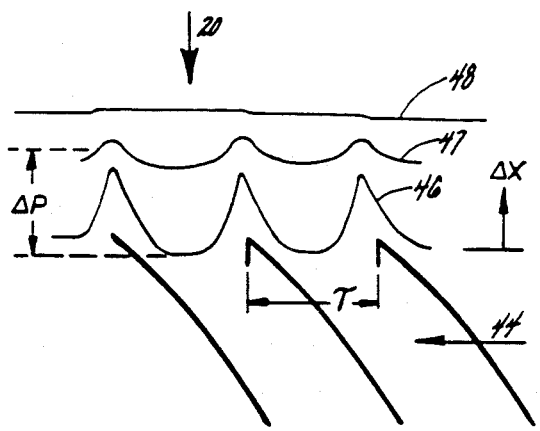
FIG. 5 is a diagram illustrating blade upwash.

Upwash from these rotating blades, which is a function of the distance $\tau$, is illustrated in FIG. 5. As the blades move in the direction 44, local pressure peaks 46 occur as upwash axially upstream of the blades. As indicated by lines 47 and 48 these rotating pressure variations quickly die off in the upstream direction. The pressure drops off quickly with distance in accordance with the formula $$\Delta P \alpha e^{-\pi x/\tau}$$

When these pressure variations occur near the tip of the blade, the adjacent casing wall that normally exists is capable of sustaining this rotating pressure profile. Should, however, there be a recess such as a bleed port opening where these variations occur, recirculation in these openings will occur reducing the gas path gapwise static pressure gradient. Flow will move radially into the holes in regions of high gas path static pressure and out of the holes in regions of low gas path static pressure. This transverse flow will consume momentum from the through flow reducing the efficiency of the compressor. In addition, the upwash will be reduced at the leading edge of the airfoil since the static pressure gradient supporting the flow curvature is reduced. Loss of the upwash will reduce the lift produced at the blade tip, reducing the overall performance of the compressor. Accordingly, referring to FIG. 2, the distance X between the opening 24 and the leading edge 40 of the blades should exceed 60 percent of the spacing $\tau$ between the blade tips. As a minimum it should exceed 40 percent of that spacing.

Figure 6:
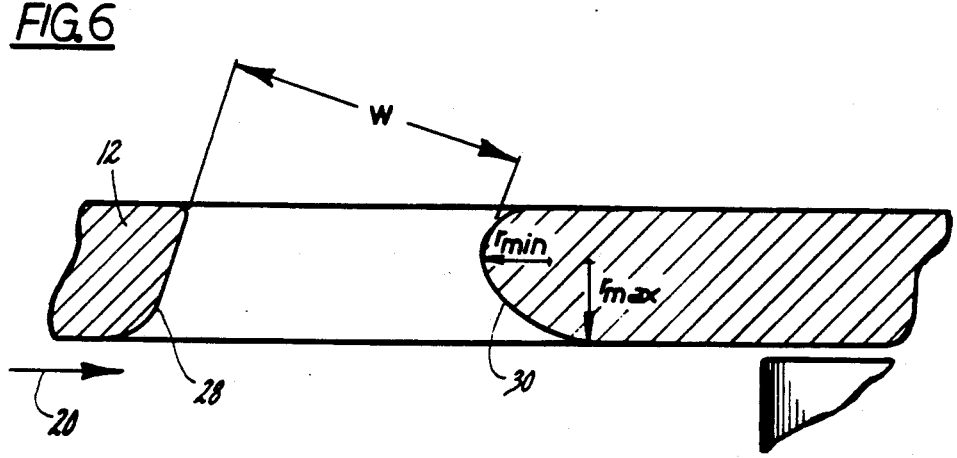
FIG. 6 is a detail of an alternate port with an elliptical upstream facing surface.

Referring now to FIG. 6, an alternate embodiment as illustrated where the only difference is the shape of the upstream facing surface 30. This upstream facing surface is now elliptical in shape with a minimum radius $r_x$ of 25 percent of the width W of the opening while it has a maximum radius $r_{max}$ of at least 33 percent of the width of the opening and possibly as much as the thickness of the casing.

Figure 7:
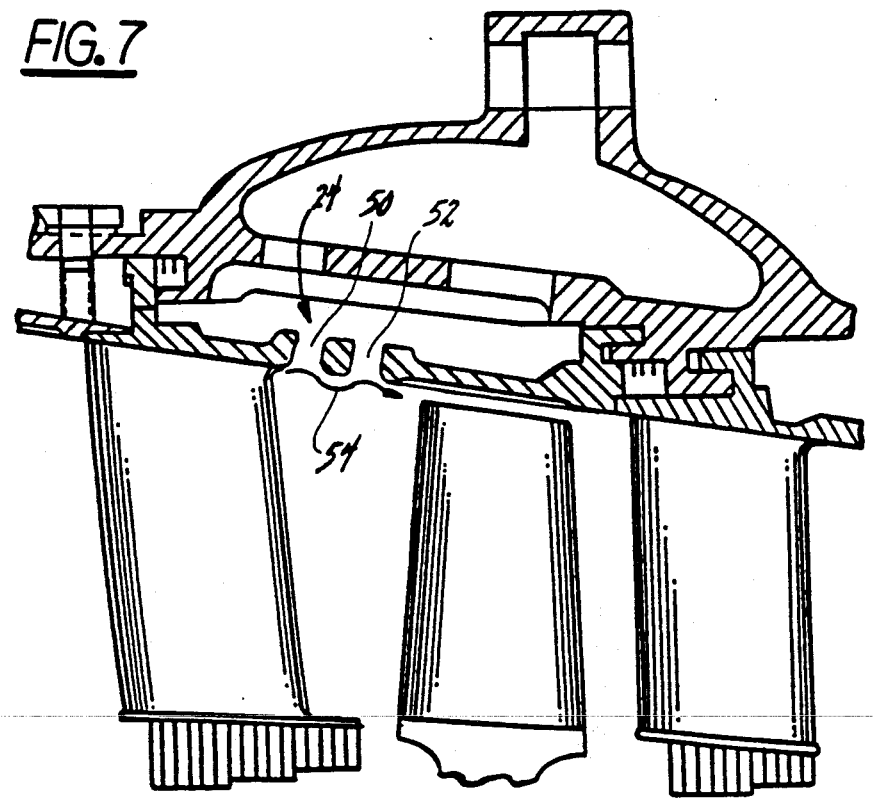
FIG. 7 is a sectional elevation showing a double opening bleed port arrangement.
Figure 8:
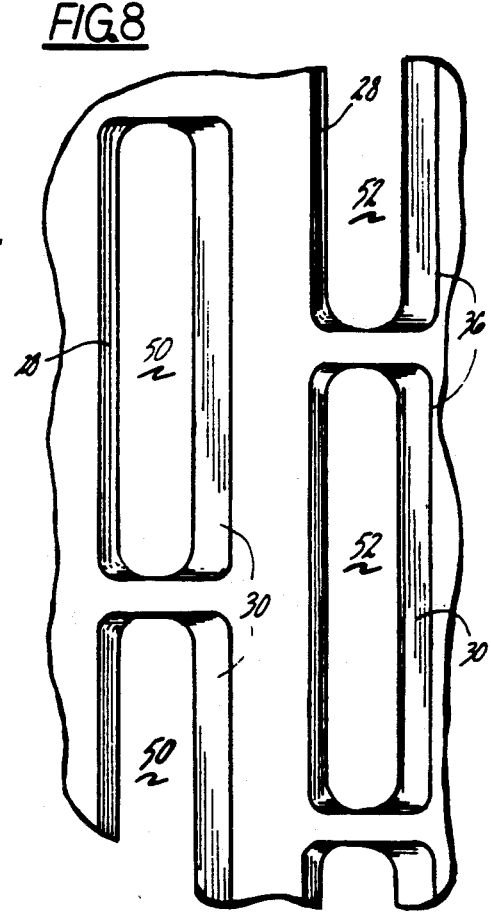
FIG. 8 is a view of the double opening port arrangement from inside the casing.

FIGS. 7 and 8 illustrate an alternate embodiment wherein the flow port 24 is composed of two rows of narrower ports, with an upstream port 50 and a downstream port 52. The ports of each row are preferably staggered with respect to those of the other row. Each of these ports has a similar downstream facing edge 28 and an upstream facing surface 30. Each of these are guided by the same parameters described before with respect to the single opening. However, because of the decreased width of the openings, the extent of flow deviation and the required radii are less than with the single port. The upstream facing surfaces therefore may be appropriately radiused to avoid flow separation. The same guidelines apply as to the spacing between the leading edge 40 of blade 18 and the tangent point 36 of the downstream openings.

Figure 9:
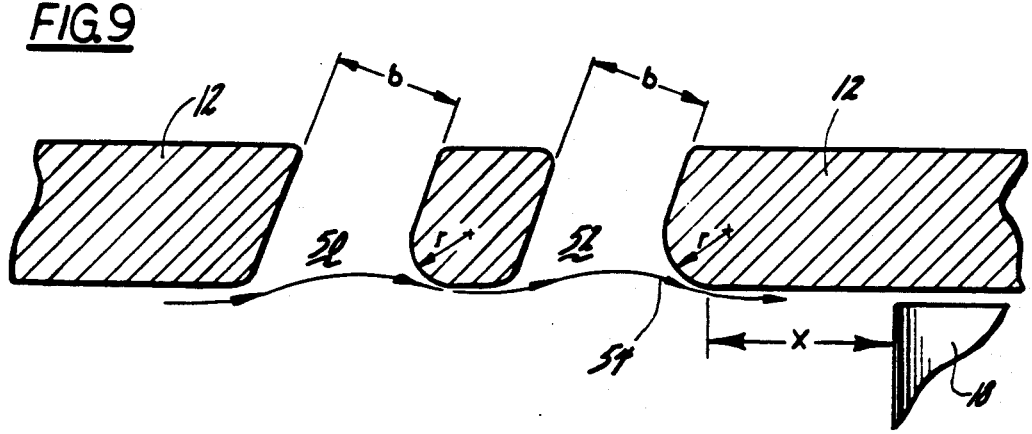
FIG. 9 is a section through the double port areas.

FIG. 9 is a section through the port area of FIG. 8 showing upstream 50 and a downstream port 52. Streamline 54 illustrates the airflow pattern. Radii r are each equal to 0.33 of the width b of the corresponding port.

We claim:

1. A bleed port arrangement for an axial flow air compressor comprising:
   a compressor case;
   a circumferential row of stator vanes in said case;
   a circumferential row of rotatable blades located to receive air directly from said vanes, said blades each having a leading edge, and a tip spacing existing between adjacent blades at a periphery of said row of blades;
   a plurality of circumferentially arranged bleed port openings in said case downstream of said vanes and upstream of said blades;
   each of said openings being substantially rectangular with a length in a circumferential direction and a width in an axial direction;
   an imaginary straight flow path extending through each opening from a downstream facing edge at a casing inside surface to a locus on an upstream facing edge of each opening, and defining a reentrance surface of said upstream facing edge from said locus to the inside surface of said casing; and
   the upstream facing edge of each opening having a radius greater than 25 percent of said width throughout said reentrant surface.

2. An apparatus as in claim 1:
   said upstream facing edge having substantially an arc of a radius greater than 30 percent of said width.

3. An apparatus as in claim 1:

said upstream facing edge having substantially an arc of a radius greater than 33 percent of said width.

4. An apparatus as in claim 1:
said upstream facing edge being substantially an elliptical form with a minor radius located adjacent to the locus and being greater than 25 percent of said width, and with a major radius adjacent said surface being less than 50 percent of said width.

5. An apparatus as in claim 1:
a tangent point defined by the junction of said upstream facing edge and the interior surface of said casing; and
the axial distance between said leading edge of said blade and said tangent point being greater than 40 percent of said tip spacing.

6. An apparatus as in claim 1:
a tangent point defined by the junction of said upstream facing edge and the interior surface of said casing; and
the axial distance between said leading edge of said blade and said tangent point being greater than 60 percent of said tip spacing.

7. An apparatus as in claim 4:
a tangent point defined by the junction of said upstream facing edge and the interior surface of said casing; and
the axial distance between said leading edge of said blade and said tangent point being greater than 40 percent of said tip spacing.

8. An apparatus as in claim 4:
a tangent point defined by the junction of said upstream facing edge and the interior surface of said casing; and
the axial distance between said leading edge of said blade and said tangent point being greater than 60 percent of said tip spacing.

9. An apparatus as in claim 1:
there being only a single row of circumferentially arranged bleed port openings.

10. An apparatus as in claim 3:
there being only a single row of circumferentially arranged bleed port openings.

11. An apparatus as in claim 4:
there being only a single row of circumferentially arranged bleed port openings.

12. An apparatus as in claim 5:
there being only a single row of circumferentially arranged bleed port openings.

13. An apparatus as in claim 1:
said plurality of circumferentially arranged bleed port openings comprising a first upstream row and a second downstream row axially spaced from said first row.

14. An apparatus as in claim 4:
said plurality of circumferentially arranged bleed port openings comprising a first upstream row and a second downstream row axially spaced from said first row.

15. An apparatus as in claim 13:
a tangent point defined by the junction of said upstream facing edge of said downstream row and the interior surface of said casing; and
the axial distance between said leading edge of said blade and said tangent point being greater than 40 percent of said tip spacing.

16. An apparatus as in claim 15:
a tangent point defined by junction of said upstream facing edge of said downstream row and the interior surface of said casing; and
the axial distance between said leading edge of said blade and said tangent point being greater than 60 percent of said tip spacing.

17. An apparatus as in claim 14:
a tangent point defined by junction of said upstream facing edge of said downstream row and the interior surface of said casing; and
the axial distance between said leading edge of said blade and said tangent point being greater than 40 percent of said tip spacing.

18. An apparatus as in claim 14:
a tangent point defined by junction of said upstream facing edge of said downstream row and the interior surface of said casing; and
the axial distance between said leading edge of said blade and said tangent point being greater than 60 percent of said tip spacing.

19. An apparatus as in claim 13:
the opening of each row of openings arranged in staggered relationship with the opening of the other row.

20. An apparatus as in claim 15:
the opening of each row of openings arranged in staggered relationship with the opening of the other row.

21. An apparatus as in claim 17:
the opening of each row of openings arranged in staggered relationship with the opening of the other row.

* * * * *